US012803867B2

(12) United States Patent
Karikallio

(10) Patent No.: US 12,803,867 B2
(45) Date of Patent: Nov. 17, 2026

(54) QUARANTINE IN AUTOMATED NETWORK MONITORING AND CONTROL

(71) Applicant: Elisa Oyj, Helsinki (FI)

(72) Inventor: Henri Karikallio, Helsinki (FI)

(73) Assignee: Elisa Oyj, Helsinki (FI)

( * ) Notice: Subject to any disclaimer, the term of this patent is extended or adjusted under 35 U.S.C. 154(b) by 343 days.

(21) Appl. No.: 18/706,022

(22) PCT Filed: Nov. 22, 2022

(86) PCT No.: PCT/FI2022/050775
§ 371 (c)(1),
(2) Date: Apr. 30, 2024

(87) PCT Pub. No.: WO2023/105116
PCT Pub. Date: Jun. 15, 2023

(65) Prior Publication Data

US 2025/0168055 A1 May 22, 2025

(30) Foreign Application Priority Data

Dec. 10, 2021 (FI) ...................................... 20216264

(51) Int. Cl.
*H04L 41/0659* (2022.01)
*H04L 41/0631* (2022.01)

(52) U.S. Cl.
CPC ...... *H04L 41/0659* (2013.01); *H04L 41/0631* (2013.01)

(58) Field of Classification Search
None
See application file for complete search history.

(56) References Cited

U.S. PATENT DOCUMENTS 11,411,845 B1 * 8/2022 Faisal Padinjareveetil ................ H04L 43/0888
2009/0181665 A1 * 7/2009 Sater .................. H04L 41/5064 455/424
2017/0214701 A1 * 7/2017 Hasan ................ H04L 63/1433
2020/0076677 A1 3/2020 Mermoud et al.
2020/0259700 A1 8/2020 Bhalla et al.
2021/0160267 A1 5/2021 Serebryakov et al.
2021/0351973 A1 11/2021 Ford et al.
2022/0237509 A1 * 7/2022 Courtney ................ G06N 3/08
(Continued)

FOREIGN PATENT DOCUMENTS

WO 20200 02771 1/2020
WO 202 12 14527 A1 10/2021

OTHER PUBLICATIONS

ETSI GS ENI 005 V2.1.1 (Dec. 2021). Experiential Networked Intelligence (ENI); System Architecture. Available at: http://www.etsi.org/standards-search.
(Continued)

*Primary Examiner* — Diane L Lo
(74) *Attorney, Agent, or Firm* — Espatent Oy

(57) ABSTRACT

A computer implemented method for automated operation of a communication network (110). The method comprises determining (301) a fault activity in the network (110), selecting (302) an automation algorithm based on a root of the fault activity, determining (303) quarantine rules, and selecting (304) an automated action for solving the fault activity based on the quarantine rules.

19 Claims, 3 Drawing Sheets

(56) References Cited

U.S. PATENT DOCUMENTS

2022/0353295 A1* 11/2022 Yeh ........................ H04L 63/029

OTHER PUBLICATIONS

Canastro, D. et al. Root Cause Analysis in 5G/6G Networks. 2021 8th International Conference on Future Internet of Things and Cloud (FiCloud). pp. 217-224. 978-1-6654-2574-2/21/$31.00©2021 IEEE. DOI 10.1109/FiCloud49777.2021. 000 39.

Kerschke Pascal et al. Automated Algorithm Selection: Survey and Perspectives. arxiv.org, Cornell University Library, 201 Olin Library Cornell University Ithaca, NY 14853, Nov. 28, 2018 (Nov. 28, 2018).

Joshi, Kaustubh R et al: Probabilistic Model-Driven Recovery in Distributed Systems. IEEE Transactions on Dependable and Secure Computing, IEEE Service Center, New York, NY US, vol. 8, No. 6, Nov. 30, 2011 (Nov. 30, 2011), pp. 913-928.

* cited by examiner

QUARANTINE IN AUTOMATED NETWORK MONITORING AND CONTROL

TECHNICAL FIELD

The present disclosure generally relates to automated network monitoring and control.

BACKGROUND

This section illustrates useful background information without admission of any technique described herein representative of the state of the art.

A network operation center (NOC) is generally a location from which NOC personnel exercises monitoring and control over a network. NOC personnel are responsible for monitoring one or many networks for certain conditions that may require special attention to avoid degraded service. NOC personnel follow screens showing events received from network devices, ongoing incidents and general network performance. NOC personnel decide upon required actions based on information they see on the screens.

Automation of NOC functionality of communication networks has been developed in order to improve efficiency of network monitoring and control and to reduce the amount of manual work and human errors. But automation of network monitoring and control is not a straightforward task to implement.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

It has been observed that in automated network operations with multiple automation algorithms it is possible that different algorithms operate with different source data but control same network elements.

Further, it has been observed that automation may cause disturbance/needless work, for example, when automated service ticket creation is not defined with certain conditions, or if a fault disappears from the network but the automated service ticket is not cancelled.

It is an object of certain embodiments of the invention to provide a method that reduces needless or superfluous service work, or at least to provide an alternative solution to existing technology.

According to a first example aspect of the present invention, there is provided a computer implemented method for automated operation of a communication network, the method comprising:

determining a fault activity in the network;

selecting an automation algorithm based on a root of the fault activity;

determining quarantine rules; and selecting an automated action for solving the fault activity based on the quarantine rules, wherein the quarantine rules are determined based on the automation algorithm and at least one of following:

time information of automated action history, and success/unsuccess information of automated action history.

In certain embodiments, the quarantine rules are determined based on both the time information and the success/unsuccess information of the automated action history.

In a broader example aspect, the quarantine rules are determined based on the automation algorithm and automated action history, wherein the time information and success/unsuccess information are presented merely as examples of the automated action history.

In certain embodiments, the method comprises selecting an automatic action that prevents another automatic action from being performed concerning said root.

In certain embodiments, the method comprises, in the event there is a plurality of automation algorithms applicable for solving the fault activity concerning the root in question:

quarantining other applicable algorithms than the selected, active, algorithm.

In certain embodiments, the method comprises:

preventing an automated action, which would otherwise have been applied, from being put into practice in the event the automated action history indicates that the selected action is already in use (or active) for the root in question (possible through the use of another automation algorithm). For example, in certain implementations according to these embodiments, the use of the automated action in question is prevented if the same or another automation algorithm with a similar action is already in use (or active) for the root in question. Similarly, in the event the selected automated action has been frequently applied so that a predefined maximum number of automated actions has already been reached, the automated action is prevented in certain embodiments. Further, in certain embodiments, if a predefined maximum number of automated actions fails has already been reached, the automated action is prevented. The maximum number of actions and action fails, respectively, is defined or set for a predefined period of time in certain embodiments.

In certain embodiments, the method comprises:

preventing an automated action in the event there is already a current automated action ongoing to solve a fault activity at the root in question.

In certain embodiments, the method comprises:

determining quarantine rules for a certain root at different levels, for example, at a network element level and at a network element controlling element level (such as a base station and base station controller level). Accordingly, in certain embodiments, there are provided quarantine rules that apply directly to a target device, process, etc., and additional quarantine rules that also apply to the target, but on a higher level (in which case a single higher-level rule may also cover other targets).

In certain embodiments, the method is implemented to monitor and control a network device of the communication network.

In certain embodiments, the method is implemented to monitor and control a customer end device.

In certain embodiments, the method is implemented to monitor and control a process of a telecom operator in question and/or generation of service tickets for service personnel. In certain embodiments, the generation, enrichment and deletion of tickets for service personnel acting at the field are controlled (for example by setting a maximum number for generated tickets per day/week/month).

In certain embodiments, the quarantine rules are determined further based on an automated action history with action type and/or based on a target network element and/or a target process.

In certain embodiments, the quarantine rules are determined further based on next available automated actions.

In certain embodiments, the communication network is a telecom operator network, such as a mobile communication network, a cable TV network, or a fixed broadband access network.

The presented method enables the apparatus (or automated system) to control network elements, processes and service personnel so that the end customer experiences minimal disturbance, and the service work done by people is minimal and up to date without performing needless or superfluous service work.

According to a second example aspect of the present invention, there is provided an apparatus, comprising:

a processor; and a memory and computer program code, the memory and the computer program code being configured, with the processor, to cause the apparatus to perform the method of the first aspect or any related embodiment.

According to a third example aspect of the present invention, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of the first aspect or any related embodiment.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Figure 1:
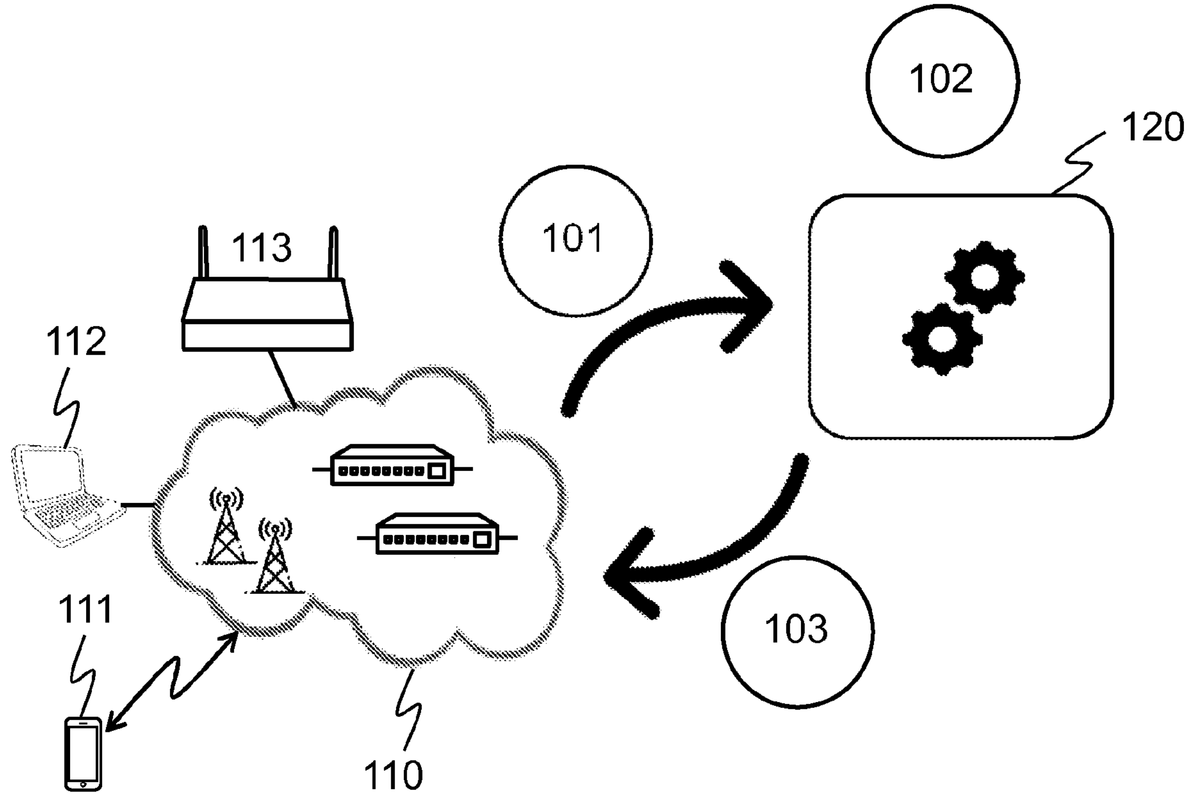
FIG. 1 schematically shows a scenario according to an example embodiment.

FIG. 1 shows an example scenario according to an embodiment. The scenario shows a communication network 110 serving a plurality of user devices (user equipment, UE) such as a mobile phone 111, a laptop computer 112, and/or a customer end router, such as a VDSL router, or a cable modem 113. In an embodiment, by the customer end router (or device) is meant a customer end device that is under remote monitoring and control of a telecom operator. The network 110 comprises a plurality of cells and base station sites and/or other network devices, such as various network switches or routers or other network elements of a fixed and/or a mobile network. In certain embodiments, a part of the network 110 is formed as an automated system 120 that monitors and controls the operation of the network 110.

In an embodiment, the scenario of FIG. 1 operates as follows: The automated system 120 regularly receives performance indicators and other information indicating whether or not the network operates properly (phase 101) from or via network element(s) of the network 110.

In phase 102, a fault activity and an automation algorithm based on a root of the fault activity is determined by the automated system 120. Further, quarantine rules are determined, and an automatic action solving the fault activity is selected based on the quarantine rules.

In phase 103, the automated system 120 implements the selected automatic action in the network 110, such as in a network device concerned or in a user device as the case may be.

Figure 2:
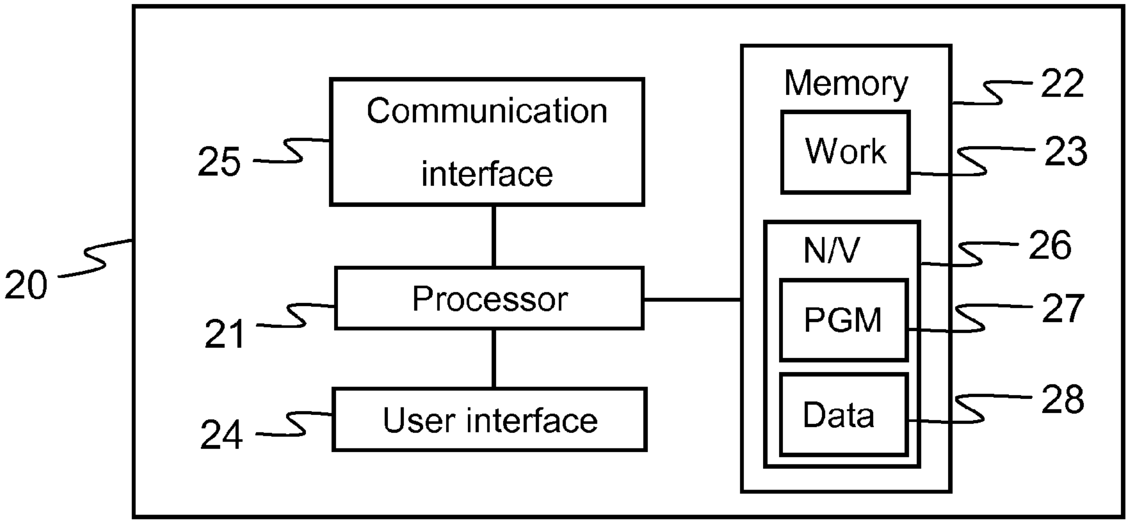
FIG. 2 shows a block diagram of an apparatus according to an example embodiment.

FIG. 2 shows a block diagram of an apparatus 20 according to an embodiment. The apparatus 20 is for example a general-purpose computer or server or some other electronic data processing apparatus. The apparatus 20 can be used for implementing at least some embodiments of the invention. That is, with suitable configuration the apparatus 20 is suited for operating for example as the automated system 120.

The apparatus 20 comprises a communication interface 25, a processor 21, a user interface 24, and a memory 22.

The communication interface 25 comprises in an embodiment a wired and/or wireless communication circuitry, such as Ethernet, Wireless LAN, Bluetooth, GSM, CDMA, WCDMA, LTE, and/or 5G circuitry. The communication interface can be integrated in the apparatus 20 or provided as a part of an adapter, card or the like, that is attachable to the apparatus 20. The communication interface 25 may support one or more different communication technologies. The apparatus 20 may also or alternatively comprise more than one communication interface 25.

The processor 21 may be a central processing unit (CPU), a microprocessor, a digital signal processor (DSP), a graphics processing unit, an application specific integrated circuit (ASIC), a field programmable gate array, a microcontroller or a combination of such elements.

The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 comprises a work memory 23 and a persistent (non-volatile, N/V) memory 26 configured to store computer program code 27 and data 28. The memory 26 may comprise any one or more of: a read-only memory (ROM), a programmable read-only memory (PROM), an erasable programmable read-only memory (EPROM), a random-access memory (RAM), a flash memory, a data disk, an optical storage, a magnetic storage, a smart card, a solid state drive (SSD), or the like.

The apparatus 20 may comprise a plurality of memories 26. The memory 26 may be constructed as a part of the apparatus 20 or as an attachment to be inserted into a slot, port, or the like of the apparatus 20 by a user or by another person or by a robot. The memory 26 may serve the sole purpose of storing data, or be constructed as a part of an apparatus 20 serving other purposes, such as processing data.

As to the automated system 120, the memory 26 in certain embodiments comprises a database or a specific memory location or a memory partition for storing the quarantine rules.

A skilled person appreciates that in addition to the elements shown in FIG. 2, the apparatus 20 may comprise other elements, such as microphones, displays, as well as additional circuitry such as an input/output (I/O) circuitry, memory chips, application-specific integrated circuits (ASIC), a processing circuitry for specific purposes such as a source coding/decoding circuitry, a channel coding/decoding circuitry, a ciphering/deciphering circuitry, and the like. Additionally, the apparatus 20 may comprise a disposable or rechargeable battery (not shown) for powering the apparatus 20 when an external power supply is not available.

Further, it is noted that only one apparatus is shown in FIG. 2, but embodiments of the invention may equally be implemented in a cluster of shown apparatuses.

Figure 3:
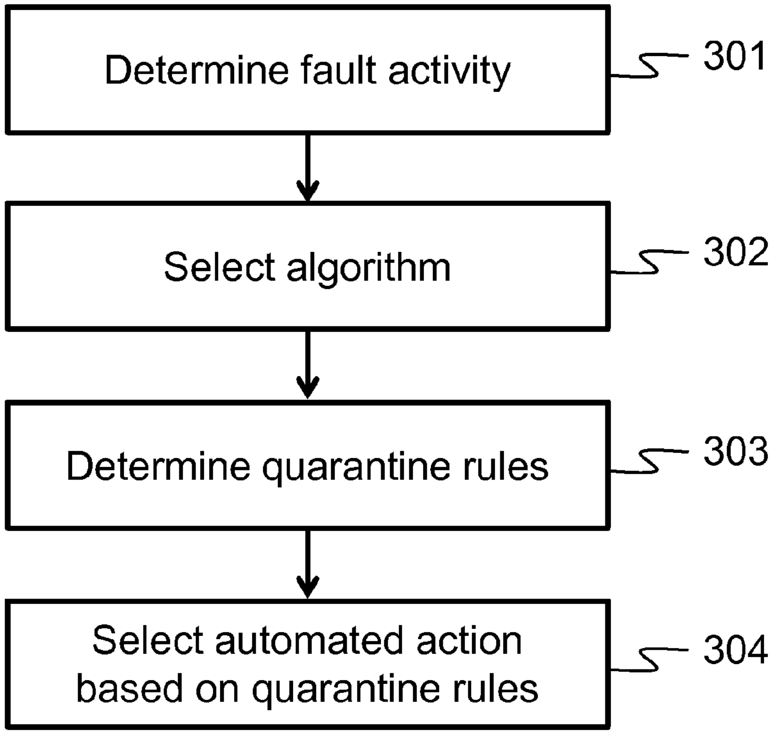
FIG. 3 shows a flow chart according to an example embodiment.

FIG. 3 shows a flow chart according to an example embodiment. In phase 301, a fault activity (such as an inacceptable value of a Key Performance Indicator, KPI) is determined. In phase 302, an automation algorithm is selected based on a root (such as mobile 4G radio access network) of the fault activity. Further, in phase 303 quarantine rules are determined based on the automation algorithm and at least one of following: time information of automated action history, and success/unsuccess information of automated action history. Finally, in phase 304, an automated action for solving the fault activity based on the quarantine rules is selected. The selected automated action depends on the embodiment concerned. For example, in certain embodiments, an automated action "quarantine" is selected based on the quarantine rules and automated action history. When in quarantine, further automatic actions are prevented for the monitored target in question. Accordingly, the automated system 120 may put devices into quarantine for a defined time period, and needless or superfluous actions may be avoided during that time. In other embodiments, for example, an automated action "reset" or "reboot" is selected based on the quarantine rules and automated action history. In certain other embodiments, merely a particular action, such as "ticket generation" is prevented.

The following examples clarify the disclosed method:

Example 1

Root: Mobile RAN 4G
Fault activity: KPI #1
Selected algorithm (NOC): Algorithm 1 (applicable for Mobile 4G RAN KPI #1)
Quarantine rules, automated action history:
- Max 10/d (Algorithm 1)
- Max 5/d (4G RAN KPI #1)
- 4 automated actions for today (KPI #1 and Algorithm 1)
- Latest action "SUCCESS" at 2:19 pm Automated action: "RESET"

The "root" herein means the monitored target at which the fault activity occurs, such as a device (such as a network element, e.g. a base station or base station controller, or a customer end device, e.g. a modem or a customer end router), system, location, or a process as the case may be. The "fault activity" herein indicates an abnormal operation. The method is triggered upon detecting the fault activity. For example, in this example an inacceptable value of a key performance indicator (here: KPI #1) is detected by the automated system. An algorithm (here: Algorithm 1) applicable for the root of the fault activity, i.e., mobile 4G radio access network (RAN), is selected. The selected algorithm has its limitations in the automated system (here: max 10 times a day). Similarly, the fault activity has its limitations in the automated system (here: 5 times a day). These present examples of the quarantine rules in this example. Further, the quarantine rules are defined by the automated action history. In this example, the history indicates 4 automated actions for the present day and the latest success of an automated action at 2:19 p.m. Based on this information about the latest automated action success and based on the finding that the daily limit has not been exceeded, a further appropriate action is selected and implemented. Here, the automated action "reset" is selected and implemented in an appropriate element of the root, mobile 4G RAN.

Example 2

Root: Mobile RAN 4G
Fault activity: Alarm #2
Selected algorithm (NOC): Algorithm 1 (applicable for Mobile 4G RAN Alarm #2)
Quarantine rules, automated action history:
- Max 10/d (Algorithm 1)
- Max 10/d (4G RAN alarm #2)
- 8 automated actions for today (Alarm #2 and Algorithm 1)
- Latest action "OPEN TICKET" at 4:04 pm Automated action: "QUARANTINE"

In this example, again relating to mobile 4G RAN, the method is triggered upon receiving an alarm (here: Alarm #2). An algorithm (here: Algorithm 1) applicable for the root of the fault activity, i.e., mobile 4G radio access network (RAN), is selected. The selected algorithm has its limitations in the automated system (here: max 10 times a day). Similarly, the fault activity has its limitations in the automated system (here: 10 times a day). These present examples of the quarantine rules in this example. Further, the quarantine rules are defined by the automated action history. In this example, the history indicates 8 automated actions for the present day and the latest at 4:04 p.m. having been a ticket generation for service personnel. Based on this information about the automated action history, in this example, the automated system concludes that the next automated action should be "quarantine", since obviously the latest action was not successful due to the need for generating a ticket. There is also no need for generating a new ticket, since a ticket already exists, nor no need for performing a repeatedly unsuccessful automated action yet again. Accordingly, the automated action "quarantine" is sensible in this case to prevent needless actions in the mobile 4G RAN.

Example 3

Root: Mobile RAN 4G
Fault activity: KPI #2
Selected algorithm (NOC): Algorithm 10 (applicable for Mobile 4G RAN KPI #2)
Quarantine rules, automated action history:
- Max 5/h (Algorithm 10)
- Max 10/d (4G RAN KPI #2)
- 6 automated actions for last day (KPI #2) and 5 automated actions for last hour (Algorithm 10)
- Latest action "SUCCESS" at 8:21 am Automated action: "QUARANTINE"

In this example, again relating to mobile 4G RAN, the method is triggered upon detecting an abnormal value of a key performance indicator (here: KPI #2). An algorithm (here: Algorithm 10) applicable for the root of the fault activity, i.e., mobile 4G radio access network (RAN), is selected. The selected algorithm has its limitations in the automated system (here: max 5 times a day). Similarly, the fault activity has its limitations in the automated system (here: 10 times a day). These present examples of the quarantine rules in this example. Further, the quarantine rules are defined by the automated action history. In this example, the history indicates 6 automated actions for the present day due to KPI #2 and 5 automated actions based on Algorithm 10 during the last hour. Based on this information about the automated action history, in this example, the automated system again concludes that the next automated action should be "quarantine", since many automatic actions have been performed at the present day, but the latest actions have not been successful.

Example 4

Root: Mobile RAN 4G
Fault activity: KPI #1
Selected algorithm (NOC): Algorithm 1 (applicable for Mobile 4G RAN KPI #1)
Quarantine rules, automated action history:
- Max 10/d (Algorithm 1)
- Max 5/d (4G RAN KPI #1)
- 4 automated actions for today (KPI #1 and Algorithm 1)
- If action fails retry after 10 min & 20 min.
- Max 1 ticket for field service/7d
- Prevent algorithm 1 for target next 7d
- Latest action "SUCCESS" at 2:19 pm Automated action: "RESET"

In this example, again relating to mobile 4G RAN, the method is triggered if an inacceptable value of a key performance indicator (here: KPI #1) is detected by the automated system. An algorithm (here: Algorithm 1) applicable for the root of the fault activity, i.e., mobile 4G RAN is selected. The selected algorithm has its limitations in the automated system (here: max 10 times a day). Similarly, the fault activity has its limitations in the automated system (here: 5 times a day). Further, the quarantine rules define that if a selected action (here: reset) fails, a retry is timed after 10 and 20 minutes. Further, only one ticket for the field service is allowed during a period of 7 days, and the algorithm 1 is prevented from being performed for the next 7 days. The automated action history indicates 4 automated actions for the present day and the latest success of an automated action at 2:19 p.m. Based on this information about the latest automated action success, the automated action "reset" can be selected as the next automated action, and there is e.g. no need to set a monitored target device into quarantine, since the algorithm 1 seems to be effective.

Example 5

Root: xDSL uptime reset
Fault activity: modem uptime >60 days
Selected algorithm (NOC): Algorithm 1 reboot
Quarantine rules, automated action history:
- Max 5000/d (Algorithm 1)
- Run time 05:00 AM
- Quarantine for rebooted modems 60d
- Create ticket for successful reboot targets
- If not successful retry next 05:00 am
- Latest action "REBOOTED" at 5:04 pm Automated action: "Reboot"

For this example, it has been observed that an uptime of more than 60 days clearly correlates with faulty operation of the monitored device (here: xDSL modem(s)). An algorithm (here: Algorithm 1 reboot) applicable for the root of the fault activity, i.e., xDSL modems is selected. The selected algorithm has its limitations (here: max 5000 times a day). A rebooted modem is set into quarantine for 60 days, and ticket information of a successful reboot is generated. If a reboot is not successful, a retry is scheduled at next day at 05:00 a.m. The automated action history indicates the latest action (here: rebooted) at 5:04 a.m. at the present day. The next selected automated action may be "reboot" or "quarantine" depending on the automated action history.

Example 6

Root: Mobile 5G action prevent
Fault activity: maintenance work in the target
Selected algorithm (NOC): Algorithm 4—maintenance activity
Quarantine rules:
- Active when change management work ticket is active
- Prevent all actions to target
- Prevent all tickets from target to process
- Prevent all actions that are detected during change management work after change management ticket is closed
- Accept actions detected before/after change management work Automated action: "Prevent action/ticket"

In this example, relating to a maintenance work process, the method is triggered if maintenance work is ongoing at a target area of a mobile 5G network. An algorithm (here: Algorithm 4—maintenance activity) applicable for preventing automated actions in the root, i.e., mobile 5G network, is selected. The selected automated action "prevent automated actions and ticket generation" is set active when the maintenance work (or related management work ticket) is active. All automated actions relating to the target (monitored device or monitored part of network) are prevented, and all ticket generation actions are prevented. Further, all such future actions that were detected (or activated) during the maintenance work but scheduled to occur in the future are prevented, but actions detected (or activated) before or after the management work will be carried out.

The examples presented in the preceding illustrate certain possibilities to put the disclosed method into practice. Furthermore, if a monitored target for example already undergoes or has just recently undergone an automated action based on a first algorithm, an identical automated caused by a second algorithm can be prevented by a quarantine rule. The automated action history contains information on which algorithm has solved or tried to solve which fault activity in which root at which time. In certain embodiments, based on the quarantine rules and the information on about the automated action history, decisions about further automated actions to be performed or prevented is made. For example, in certain embodiments, if a first automated action has been performed repeatedly, that automated action is prevented if the automated action has not solved the fault activity. In certain embodiments, a pre-defined set of automated actions or all automated actions concerning a certain root are prevented based on the automated action history.

In general, the automated system 120 may implement tens or even hundreds of different algorithms. A single algorithm may be configured to control network elements, processes and/or service personnel independently but the algorithm may also be controlled based on the quarantine rules.

In an example, only one algorithm can be active at a time for selecting an automated action for solving the fault activity. The other algorithms may be quarantined for solving the same fault activity and/or controlling of the same network element, process and/or service simultaneously with the already active algorithm.

In an example, the quarantine rules may be determined for different levels, such as base stations and base station controllers. For example, a first number (e.g. 1) of reset actions/service tickets/parameter changes per base station in certain time period, or a second number (e.g. 100) of resets/service tickets per base stations under the base station controller in certain time period. Further examples could be allowing a third number (e.g. 50) service tickets for field service in a week, or a fourth number (e.g. 7) predictive maintenance actions (predictive reset) per week.

In an example, when determining a fault activity in the network, the situation may be that a plurality of simultaneous automated processes using different algorithms are already active. These automated processes may monitor the network elements, devices etc. independently without knowledge of each other. When an automation algorithm is selected to solve the problem caused by the fault activity, the automation system may consider reasons why certain automated action should not be done. This may be due to various reasons, such as: an action is already done in re the fault activity (by another process or algorithm, for example) or the maximum number of automated actions is already reached, for example. This decision for selecting an automated action for solving the fault activity can be done based on the quarantine rules.

Figure 4:
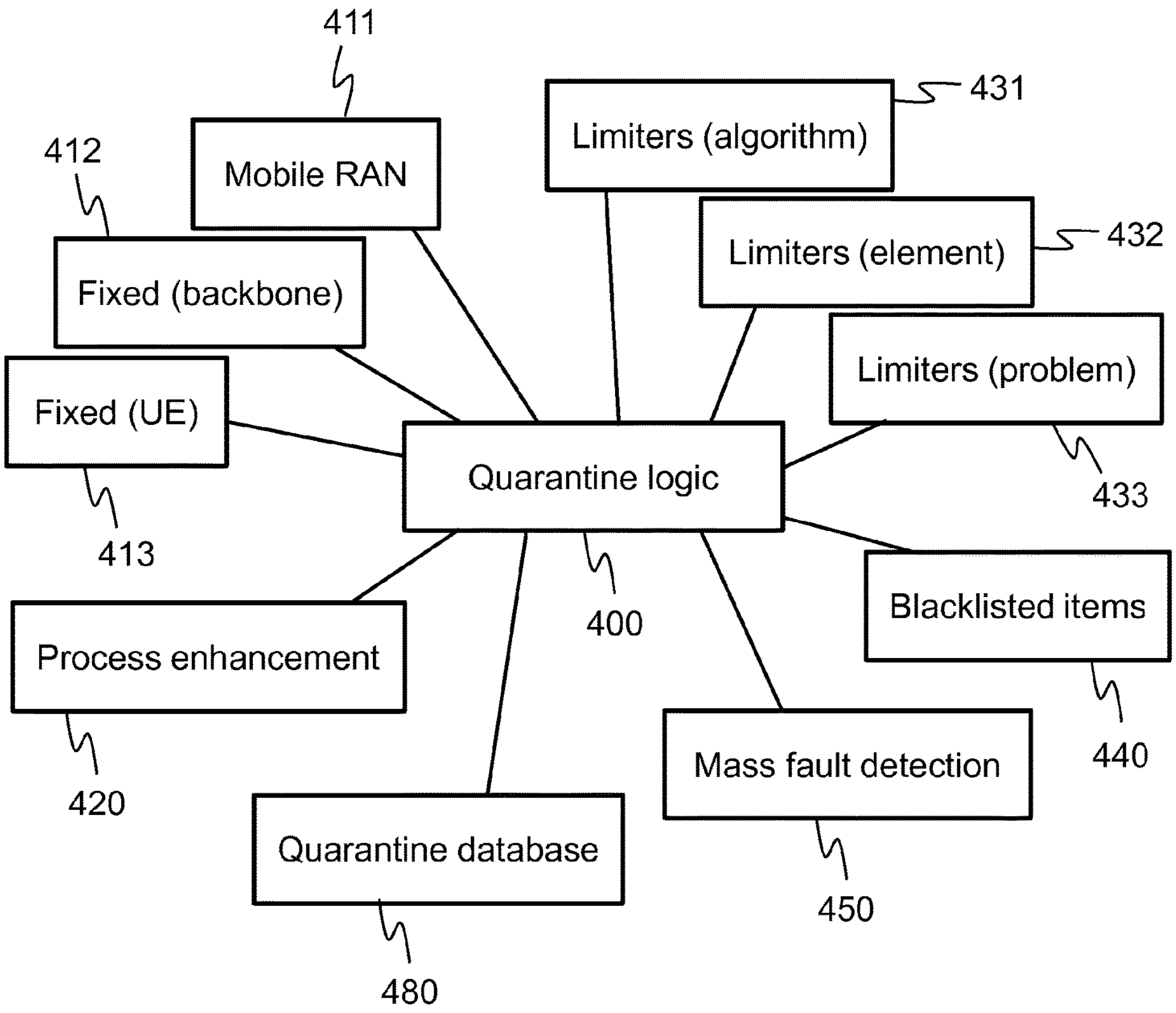
FIG. 4 shows different factors having an effect on quarantine logic according to an example embodiment.

FIG. 4 yet shows different factors having an effect on quarantine logic (quarantine rules) 400 according to an example embodiment. The mobile RAN (Radio Access Network) 411 comprises network devices in different generation mobile networks, such as 2G, 3G, 4G, and 5G. The network devices are manufactured by different vendors and have different technologies and functionalities. These will affect the required quarantine rules. The fixed backbone network 412 will allow less automated actions. Accordingly, the fixed backbone network requires its own rules. Operator-controller user equipments (such as customer end routers, cable modems, etc.) of the fixed network 413 might require resets or reboots due to memory overflow or similar more often than for example base stations of the mobile RAN 411. They will thus require their own rules.

The process enhancement function 420 will contain processes, such as ticket creation, open ticket handling, new ticket handling, ticket enrichment, and ticket closure. For the ticket creation process, quarantine rules may be determined e.g. based on network element information, network element problem history, and network element ticket history. For the open ticket handling, whether the same network element already has an open ticket will matter, or whether there are open tickets at the area a target network element operates, or concerning the same technology. For the new ticket handling, input from a helpdesk or from the field service can be taken into account. For the ticket enrichment, new information can be added to an existing ticket. For the ticket closure, new information from a network status change and new information from another process can be taken into account.

Certain applicable limiters 431 depending on the selected algorithm are for example as follows: a maximum allowed action per hour/day/week/month can be determined by the quarantine rules. Similar limiters 432 can be applied based on or depending on the target element (network element under monitoring and control) in question. Further, limiters 433 tied to a certain problem can be applied. For example, KPI-based limiters (allowed maximum number of actions per a certain time period for KPI #1, KPI #2, etc.), alarm-based limiters (allowed maximum number of actions per a certain time period for alarm #1, alarm #2, etc.), uptime-based limiters (carry out an action if the uptime of a certain network element exceeds a certain period of time).

There may be blacklisted items 440, such as critical devices of hospitals or authorities the resetting or booting of which should be prevented.

Further, certain faults detected by mass fault detection 450, such as faulty action caused by storm, massive power outage or similar extreme conditions can be taken into account so that the fault activity in those cases is not interpreted as a problem of an individual device only.

A quarantine database 480 is a location in which the algorithms are stored, and in which historical data and status of the monitored and controlled entities (network entities, customer end devices and processes) is maintained.

Quarantine rules are determined taking all or some of the above factors into account in an appropriate manner depending on the embodiment.

Without limiting the scope and interpretation of the patent claims, certain technical effects of one or more of the example embodiments disclosed herein are listed in the following. A technical effect is providing a quarantine process for automated network operation. Another technical effect is reduction of superfluous or needless actions or service work.

It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method for automated operation of a communication network, the method comprising:

determining a fault activity in the network;

selecting an automation algorithm based on a root of the fault activity;

determining quarantine rules; and selecting an automated action for solving the fault activity based on the quarantine rules, wherein the quarantine rules are determined based on the automation algorithm and at least one of following:

time information of automated action history, and success/unsuccess information of automated action history; the method further comprising preventing an automated action from being put into practice in the event the automated action history indicates that the selected action is already in use for the root in question.

2. The method of claim 1, wherein the quarantine rules are determined based on both the time information and the success/unsuccess information of automated action history.

3. The method of claim 2, comprising selecting an automatic action that prevents another automatic action from being performed concerning said root.

4. The method of claim 2, comprising, in the event there is a plurality of automation algorithms applicable for solving the fault activity concerning the root in question:

quarantining other applicable algorithms than the selected algorithm.

5. The method of claim 2, comprising:

determining quarantine rules for a certain root at different levels, for example, at a network element level and at a network element controlling element level.

6. The method of claim 2, wherein the method is implemented to monitor and control a network device of the communication network.

7. The method of claim 1, comprising selecting an automatic action that prevents another automatic action from being performed concerning said root.

8. The method of claim 7, comprising, in the event there is a plurality of automation algorithms applicable for solving the fault activity concerning the root in question:

quarantining other applicable algorithms than the selected algorithm.

9. The method of claim 7, comprising:

determining quarantine rules for a certain root at different levels, for example, at a network element level and at a network element controlling element level.

10. The method of claim 1, comprising, in the event there is a plurality of automation algorithms applicable for solving the fault activity concerning the root in question:

quarantining other applicable algorithms than the selected algorithm.

11. The method of claim 10, comprising:

determining quarantine rules for a certain root at different levels, for example, at a network element level and at a network element controlling element level.

12. The method of claim 1, comprising:

determining quarantine rules for a certain root at different levels, for example, at a network element level and at a network element controlling element level.

13. The method of claim 1, wherein the method is implemented to monitor and control a network device of the communication network.

14. The method of claim 1, wherein the method is implemented to monitor and control a customer end device.

15. The method of claim 1, wherein the method is implemented to monitor and control a process of a telecom operator in question and/or generation of service tickets for service personnel.

16. The method of claim 1, wherein the quarantine rules are determined further based on an automated action history with action type and/or based on a target network element and/or a target process.

17. The method of claim 1, wherein the quarantine rules are determined further based on next available automated actions.

18. An apparatus, comprising:

a processor; and a memory including computer program code, the memory and the computer program code being configured, with the processor, to cause the apparatus to perform the method of claim 1.

19. A non-transitory computer readable medium having stored there on a computer program comprising computer executable program code which when executed by a processor causes an apparatus to perform the method of claim 1.

* * * * *